United States Patent [19]

Inman et al.

[11] Patent Number: 5,419,102
[45] Date of Patent: May 30, 1995

[54] GRAIN BAGGING MACHINE

[75] Inventors: Larry R. Inman, Warrenton; Ronald V. Garvin, Hammond; Patrick S. Welch, Astoria, all of Oreg.

[73] Assignee: Ag-Bag Corporation, Warrenton, Oreg.

[21] Appl. No.: 100,682

[22] Filed: Aug. 2, 1993

Related U.S. Application Data

[63] Continuation-in-part of Ser. No. 865,858, Apr. 9, 1992, abandoned, which is a continuation-in-part of Ser. No. 671,386, Mar. 19, 1991, Pat. No. 5,140,802.

[51] Int. Cl.$^6$ ................. B65B 9/10; B65B 39/06; B65B 43/42
[52] U.S. Cl. .................... 53/567; 53/576; 53/257
[58] Field of Search ............ 53/257, 261, 567, 570, 53/575, 576, 577; 141/67, 114, 231

[56] References Cited

U.S. PATENT DOCUMENTS

| | | | |
|---|---|---|---|
| 640,623 | 1/1900 | Block | 53/257 |
| 1,705,063 | 3/1929 | Mitchell | 53/257 |
| 2,590,327 | 3/1952 | Kay | 53/257 |
| 3,827,578 | 8/1974 | Hough | 141/67 X |
| 3,837,540 | 9/1974 | Wagener | 141/67 X |
| 3,900,055 | 8/1975 | Henry | 141/67 |
| 4,051,644 | 10/1977 | Eide et al. | 53/257 X |
| 4,484,606 | 11/1984 | Kosters | 141/114 |
| 4,545,410 | 10/1985 | Paul et al. | 141/67 X |
| 4,567,820 | 2/1986 | Munsell | 53/567 X |
| 4,611,642 | 9/1986 | Durham | 141/114 |
| 4,621,666 | 11/1986 | Ryan | 53/576 |
| 4,653,553 | 3/1987 | Cox et al. | 141/114 |
| 4,945,715 | 8/1990 | Brodecht | 53/261 X |
| 5,125,218 | 6/1992 | SmithGander et al. | 53/576 |

*Primary Examiner*—Linda B. Johnson
*Attorney, Agent, or Firm*—Robert L. Harrington

[57] ABSTRACT

A crop bagging machine is provided with a movable chassis having adjustable brakes and a grain container having a rear tunnel defining a rear opening. A pliable plastic bag is fit to the tunnel with the bag bottom closing the opening. A bin on the chassis receives grain, e.g., from a truck and an auger transports the grain from the bin to an elevated position in the container that is above the height of the filled bag. The adjustable brakes are set to establish the level of grain pile in the container to cover the opening and thereby fill the bag. The brakes are independently controlled to provide limited steering. An additional embodiment of the invention shows downsizing for reduction in cost and in dimension for compatibility with conventional shipping containers while further providing adjustability in tunnel size to accommodate variation in bag diameter. A further additional embodiment provides for a modified conveyor system for the grain that utilizes air flow. This latter embodiment provides added versatility for use in removing stored grain when storage is no longer desired.

13 Claims, 14 Drawing Sheets

GRAIN BAGGING MACHINE

RELATED APPLICATION

The present application is a continuation-in-part of U.S. patent application Ser. No. 865,858, filed Apr. 9, 1992, by applicants herein and entitled IMPROVED GRAIN BAGGING MACHINE, now abandoned which application is a continuation-in-part of U.S. patent application Ser. No. 671,386, filed Mar. 19, 1991, by applicants' herein and entitled GRAIN BAGGING MACHINE AND METHOD now issued into U.S. Pat. No. 4,140,802.

FIELD OF THE INVENTION

This invention relates generally to agricultural crop storage and particularly to a bagging machine for filling large storage bags with grain.

BACKGROUND OF THE INVENTION

Farmers who raise grain crops often have need for storage facilities for their grain. It has been very common for farmers to build and maintain permanent building structures for this purpose. The cost of such structures is high and the lack of sufficient storage space can result in a farmer having to sell his grain crop prematurely at a significant loss in revenue.

A similar problem was addressed some years ago for cattle or dairy farmers having to store silage used to feed cattle, e.g., in the winter. In a manner similar to grain storage, huge permanent structures called silos were commonplace on dairy and cattle farms. However, the cattle farmer was provided with a solution. A method of storing silage in large plastic bags was developed as well as the equipment for accomplishing the new storage method. A movable machine with a feed rotor and a huge folded plastic bag feeds silage to the rotor and the rotor compacts the silage into the bag. The plastic storage bags can be up to 12 feet in diameter and as much as 250 feet in length. The bag unfolds from the machine as the machine moves away from the bag in response to filling of the bag. The unfolding or extension of the bag and the movement of the machine must be controlled to insure proper filling of the bag. This is accomplished by a stop positioned behind the bag to prevent rearward sliding and by a brake mechanism adjusted to resistively yield in response to the pressure that is created as the rotor compresses the silage against the stop, i.e., the machine is pushed forward by force feeding the silage into the bag and against the stop. The force required to move the machine against the resistance of the brake is established as that force required to satisfactorily fill the bag.

Numerous patent disclosures have addressed this concept. Representative of these patents are U.S. Pat. No. 3,687,061 (Eggenmuller), U.S. Pat. No. 4,046,068 (Eggenmuller), U.S. Pat. No. Re 31,810 (Lee) and U.S. Pat. No. 4,337,805 (Johnson, et al).

This process works well for silage but is almost useless for filling a pliable plastic bag with grain. Rotor teeth used to force feed silage into the bag simply slide through the more fluid-like grain particles. Various feed mechanisms were tried for grain, but none were found satisfactory.

Advancements in agricultural technology directed towards improved crop storage apparatus and methods do not always find practice throughout all regions of the world. Many regions are capable of producing and using advanced agricultural machinery and thereby take advantage of current agricultural innovations. In many other regions, however, such advanced machinery is not available, yet the need for crop storage is enormous. In such other regions, use of advanced crop storage methods can greatly enhance the efficient use of locally grown crops. Unfortunately, advanced crop storage methods and apparatus have not been available due to either an inability to produce or affordably acquire such advanced apparatus, or due to prohibitive shipping costs for such apparatus. Generally, the cost of manufacture and shipping of such apparatus prohibits wide spread use in distant regions, i.e., regions distant from the point of manufacture and requiring overseas shipping from the point of manufacture. Accordingly, it is desirable that advanced agricultural storage methods and apparatus be adapted to allow for economically feasible acquisition by farming concerns in remote regions of the world.

Even on a local level, i.e., local relative to a region where advanced crop storage apparatus are manufactured, there exists a need for more wide spread availability and use of advanced crop storage apparatus. For example, many small farming concerns would benefit by the use of advanced crop storage apparatus, but cannot afford such apparatus due to the heretofore large scale implementation of such apparatus driving the cost of feasible acquisition and use beyond the capabilities of the small farming concern. In many farming communities, large crop storage apparatus are not well suited for effective use because of the inability of such apparatus to accommodate the needs of the various small farming concerns in the community. For example, such large crop storage apparatus are built for specific storage bag diameters, without an ability to accept variation in storage bag diameter. Each small farming concern may require, however, variation in the size of crop storage bags. It is not economically feasible for such farming communities to share multiple large scale crop bagging apparatus, one for each size of bag used in the community. Also, in such communal use of bagging machines, the machine should be capable of convenient transportation between members of the community. Thus, it is desirable that a crop storage apparatus be easily transportable along conventional roadways and be adaptable to accommodate storage bags of various diameter. In this manner, one or several such crop storage apparatus may be used collectively in a small farming community, yet satisfy all the various needs of the members of the community.

Accordingly, an object of the present invention is to provide a bagging machine more economically available and more easily transported, including local transport between small farming concerns and international transport by overseas shipping to remote regions of the world.

SUMMARY OF THE INVENTION

The basic problem addressed under the present invention is the very limited lateral stability of a mass of grain. It is fluent or non-viscous to a far greater extent than hay, straw or silage. Prior to this invention, there was no known grain conveying system that would deliver grain into and fill a horizontally oriented storage bag.

The present invention solves the problem grain bag storage with a method that embraces the property of grain to flow freely. In brief, a mobile bag filling machine has a container provided with means for mounting a folded (gathered) bag surrounding an opening at the rear of the container. The container is provided with sufficient height so that grain can be filled to a height greater than the height of the bag when filled. A front wall of the container is rearwardly angled top to bottom and an entry for grain delivery is provided at the top of the container.

Adjustable brakes are provided to the wheels of the container (although the brake resistance is far less than that required for silage compaction). Grain is delivered into the top of the container. The fluent property of the grain produces lateral pressure against the bag bottom which is covering the opening. Similar lateral pressure is applied against the front wall. The bag end is pushed rearward until the weight of the grain in the bag that is resting on the ground resists rearward sliding of the bag. The bag continues to fill as the level in the container rises until the capacity for the unfolded portion of the bag extended from the opening is reached.

The lateral pressure applied against the front wall increases as the grain level increases in the container. This pressure urges forward movement of the machine. The brakes are set to permit movement only at the level of pressure that provides for the bag to be filled to capacity. The machine thereby creeps forward as the extended portion of the bag is filled to capacity. The forward movement unfolds more of the bag and the process continues until all of the bag is unfolded and filled at which point the bag is removed from the machine and tied off.

Additional desired features are also provided. The front of the machine carries a hopper into which the grain is deposited. A grain auger, augers the grain to the entry at the top of the container. Motors, e.g., hydraulic motors, as well as controls for both the auger and brake system are mounted on the machine. An operator operating the controls can steer the machine, adjust the brake pressure as needed to maintain capacity filling, and adjust the auger speed to maintain a desired filling rate.

According to a second illustrated embodiment of the present invention, the container of the grain bagger may be varied in cross-sectional area in order to accommodate storage bags of different diameter. In such modification of the grain bagger container, the bagger also has substantially reduced overall dimension facilitating compact storage and transportation, e.g., within an overseas cargo box. Also, the grain bagger is modified in various aspects to downsize the grain bagger in terms of cost of manufacture while not significantly degrading the crop storage capabilities of the machine. Thus, the grain bagger may be produced at a lower overall cost to the user, including users in remote regions of the world, because it is less expensive to build and ship to distant regions of the world where advanced, yet affordable, crop storage apparatus are in great need.

A third illustrated embodiment provides a more versatile conveyor for the grain. The augers of the prior embodiments are replaced with hoses or lines. A pump mounted on the machine generates a negative air flow that draws (or sucks) grain through a hose and into a separation chamber. The grain settles to the bottom of the chamber and into a receptacle and the air is drawn out through the top of the chamber and to the pump. A second hose directs the positive air flow from the pump through the receptacle. The grain is again entrained in the air flow which carries it into a third hose which directs the grain into the machine's container for bagging the grain. Alternatively, the vacuum system can be utilized to remove grain from the storage bag and transfer the grain to a truck for hauling, e.g., to market.

The subject matter of the present invention is particularly pointed out and distantly claimed in the concluding portion of this specification. However, both the organization and method of operation of the invention, together with further advantages and objects thereof, may best be understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made by way of example to specific embodiments of the present invention shown in the accompanying drawings in which.

DETAILED DESCRIPTION

Figure 1:
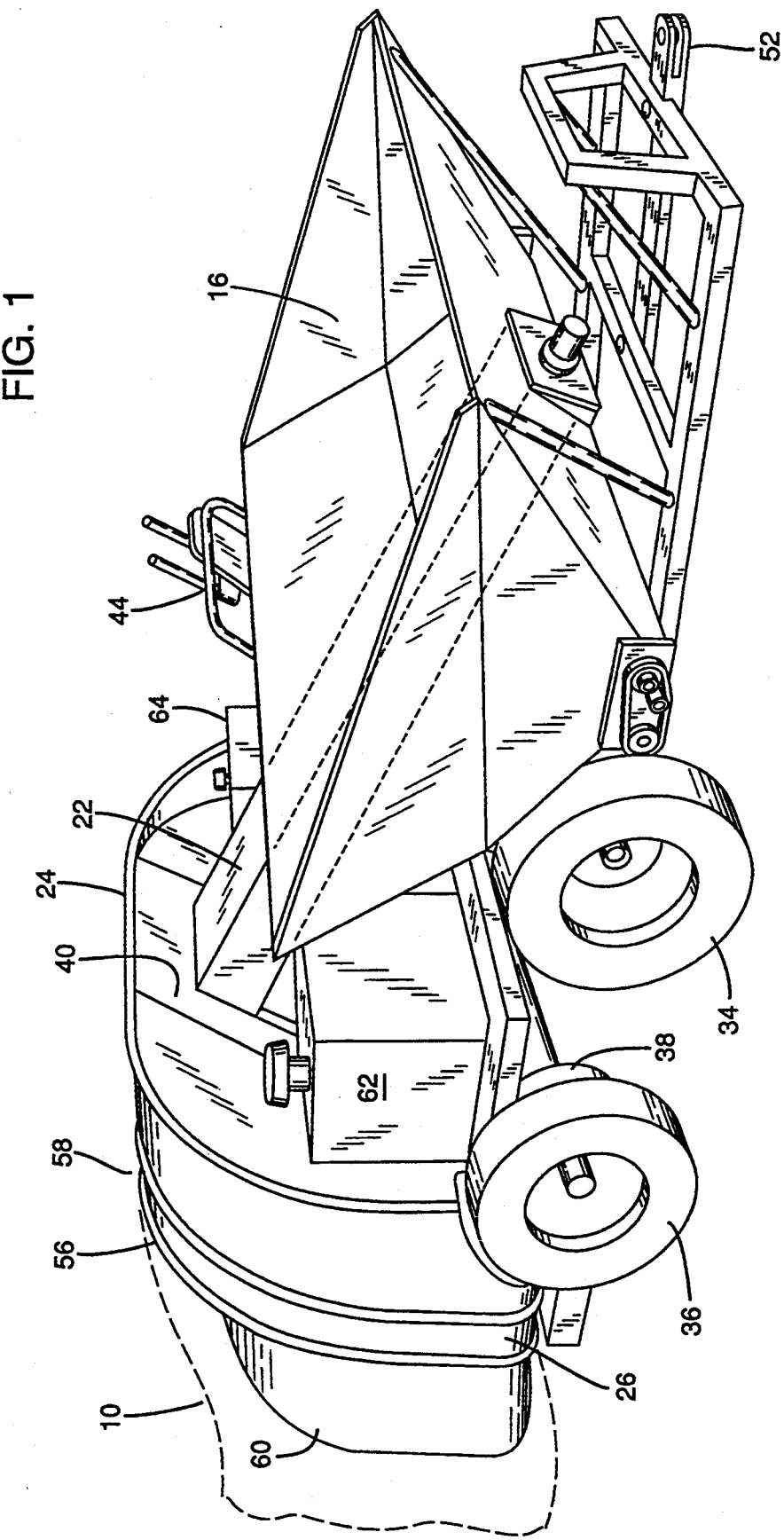
FIG. 1 is a perspective of a first grain bagging machine in accordance with the present invention.
Figure 2:
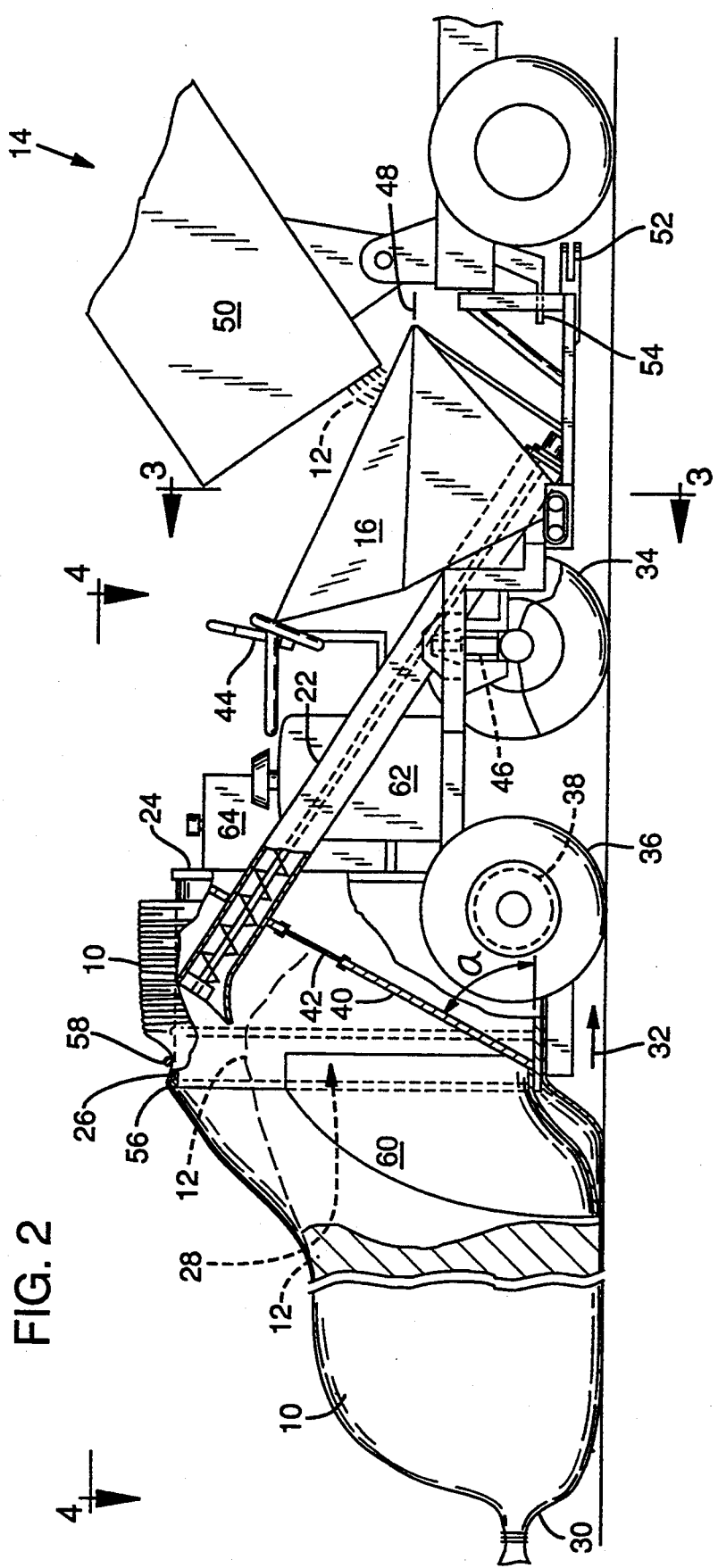
FIG. 2 is a side view of the grain bagging machine of FIG. 1 and illustrates the method of the invention.

FIGS. 1 and 2 illustrate generally a first grain bagging machine and the process utilized in filling a plastic bag 10 with grain 12 hauled to the bagging machine, e.g., by a truck 14.

Figures 3, 4:
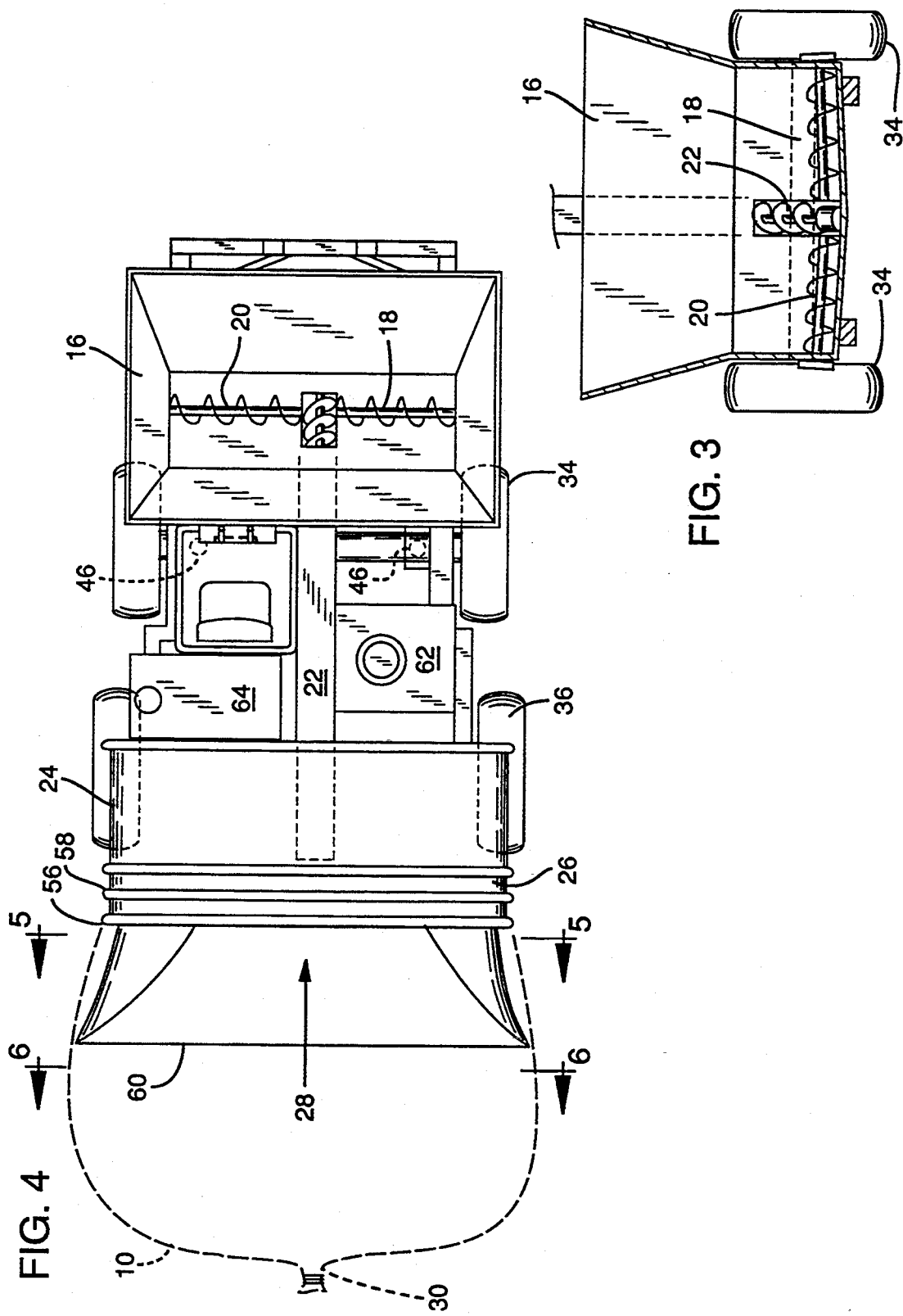
FIG. 3 is a section view of the receiving hopper or bin as taken on view lines 3—3 of FIG. 2.
FIG. 4 is a top view of the bagging machine as taken along lines 4—4 of FIG. 2 but illustrating the filled bag extended from the grain bagging machine.

As illustrated in FIGS. 1-3, the grain bagging machine includes a hopper or bin 16 for receiving the grain 12. The hopper 16 is configured to direct the flow of grain toward the center of the hopper as can best be seen in FIG. 3. Side augers 18 and 20 assist the flow of the grain to the center where a lifting auger 22 carries the grain into the container 24 of the machine. In FIG. 2, the grain 12 in the container 24 builds into a pile, first flowing rearward into the tunnel 26 that defines a rear opening in the container 24, indicated by arrow 28. The pliable plastic bag 10, in gathered or folded condition is fit over the tunnel 26 with the bag bottom 30 closing the container opening 28. The closed end 30 of the bag is pushed off the tunnel and onto the ground as the grain begins to pour into the bag. As the bag begins to fill, further rearward sliding of the bag is resisted and grain is simply piled higher inside the container which flows into and fills the bag end and tunnel.

The machine is mounted on two sets of wheels, a front set of wheels 34 and a rear set of wheels 36. The wheels permit the machine to move in a forward direction (the direction of arrow 32). Wheels 36 are provided with adjustable brakes 38. The brakes are designed to resistively release when sufficient forward urging of the machine is developed. This forward urging is generated by the grain piled in the container 24 acting against the container's forward wall 40.

Forward wall 40 is preferably angled rearwardly, illustrated in the drawing as angle alpha. Whereas the wall 40 being angled is believed to enhance the forward thrust applied to the machine, but the precise angle is variable. The incline of wall 40 has a secondary benefit in that the container 24 is more completely and easily emptied by reducing the cross-section of the container near the bottom. A preferred angle for the wall 40 is within an angular range of about 45 degrees to 65 degrees.

The brake pressure applied to the brakes 38 of wheels 36 is controllably varied. The primary concern and controlling factor in such brake control is the satisfactory filling of the bag. As the brake release pressure is adjusted downwardly, i.e., less braking force applied, the maintained level of the pile in the container 24 will lower, whereas increased braking force causes the maintained level to rise.

The bag 10 is filled when the pile 12 rises to a height that exceeds the height of the filled bag. The configuration of the top of pile 12 is domed and the desired height on wall 40 is substantially the same height as the filled bag. The operator of the machine may prefer to simply monitor the maintained level of grain to determine when the desired brake pressure is achieved and adjust the brake pressure accordingly. A small window 42 in wall 40 enables the operator to visually observe the maintained level of grain. This is deemed preferable although it is recognized that a sensor may be positioned at the desired height to sense the pressure of the grain pile at the desired level, and provide automatic adjustment of the level of brake resistance in response thereto.

The brakes 38, as explained, are preferably mounted to wheels 36 located on each side of the machine. Controls for adjusting the brakes are provided at the operator station on a control panel 44. The two brakes are preferably independently adjustable which provides limited steering control of the vehicle by the operator.

Also, as previously explained, grain from the hopper or bin 16 is carried from the hopper to the container 24 by a grain auger 22. Within the hopper bin, augers 18 and 20 direct the grain from the hopper sides to the center. One benefit of the side augers 18 and 20 is that on occasion a mixture of grains is desirable and the hopper can be set up to receive a different type of grain at each side of the hopper. The hopper may be separated by a center baffle which is not shown in the figure. The different grains can be fed at different rates into the elevator auger 22. This is permitted by separate controls for the augers controlled by the operator from control panel 44.

Adjustability in the height of the hopper 16 is also desirable. With reference to FIGS. 2 and 4, lifting jacks 46 are mounted between the axle of wheels 34 and support for the bin 16. The bin 16 is thus raised and lowered relative to the wheels 34. Such raising and lowering is desirable to fit the forward edge 48 of the hopper bin to the height of the truck box (FIG. 2). A further benefit of this bin height adjustability is to enable easy hookup of the machine for towing.

Note the hitch 52 at the front of the machine in FIG. 2. It is shown in the figure as attached to the machine during the bag filling operation. However, it is considered preferable to make the hitch 52 detachable for removal during the filling operation. In any event, before towing the machine to or from a grain bagging site, the hitch 52 of the machine will likely be misaligned with the hitch 54 of the truck and must be raised into alignment before the hitches can be engaged. In order to achieve this alignment, the hopper 16 is raised by jacks 46. The hitches 52, 54 are connected and jacks 46 are reversed to draw the wheels up under the hopper 16 for towing. Controls for raising and lowering the jacks are provided on control panel 44.

Figure 5:
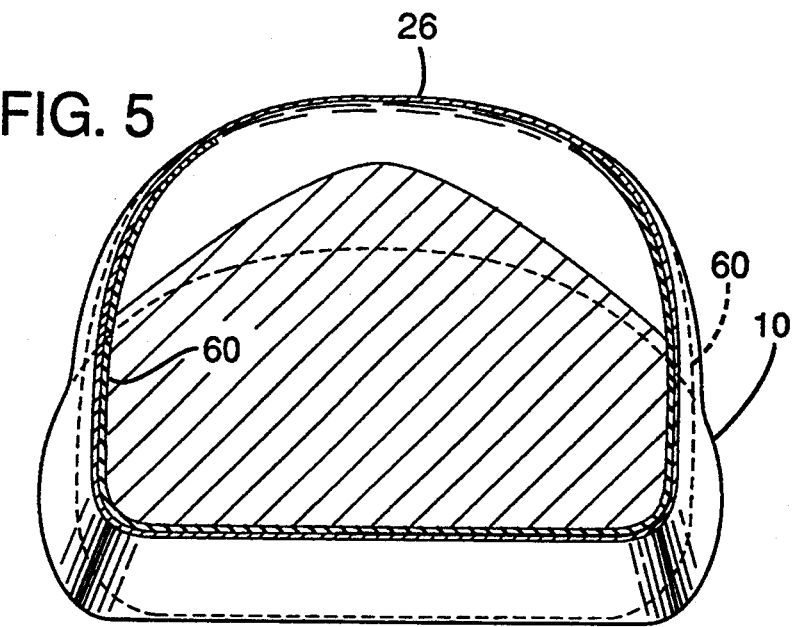
FIGS. 5 and 6 are section views of the bag and a bag liner as taken on view lines 5—5 and 6—6, respectively, of FIG. 4.
Figure 6:
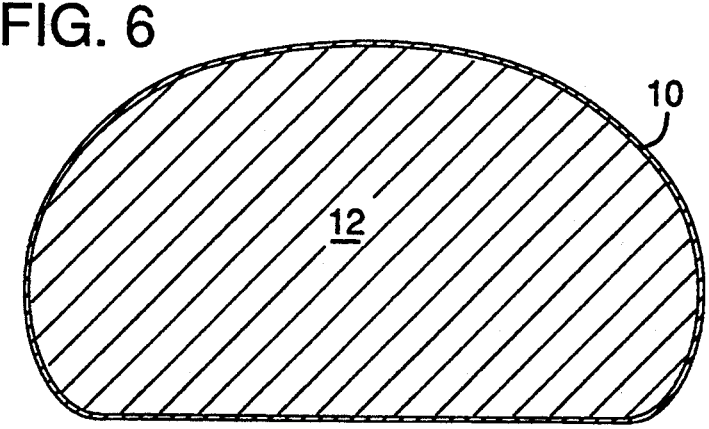

Referring now to FIGS. 4-6, as previously explained the tunnel 26 functions to retain the folded bag 10. It is adequately retained on the tunnel by an elastic cord 58 (sometimes referred to as a bunge cord) wrapped over the bag and around the tunnel. A bead 56 forward on the periphery of the tunnel exterior cooperates with the elastic cord 58 to generate sufficient sliding resistance of the bag to prevent inadvertent withdrawal of the bag. The resistance does not prevent the bag from being pulled off by the pressure of the filling operation as illustrated in FIG. 1.

Figure 7A:
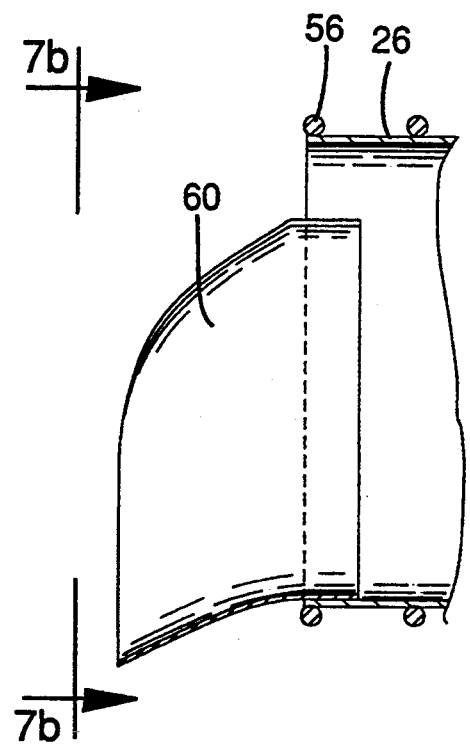
FIGS. 7a and 7b are views showing the configuration of the bag liner as the grain being bagged flows out of the machine and into the bag.
Figure 7B:
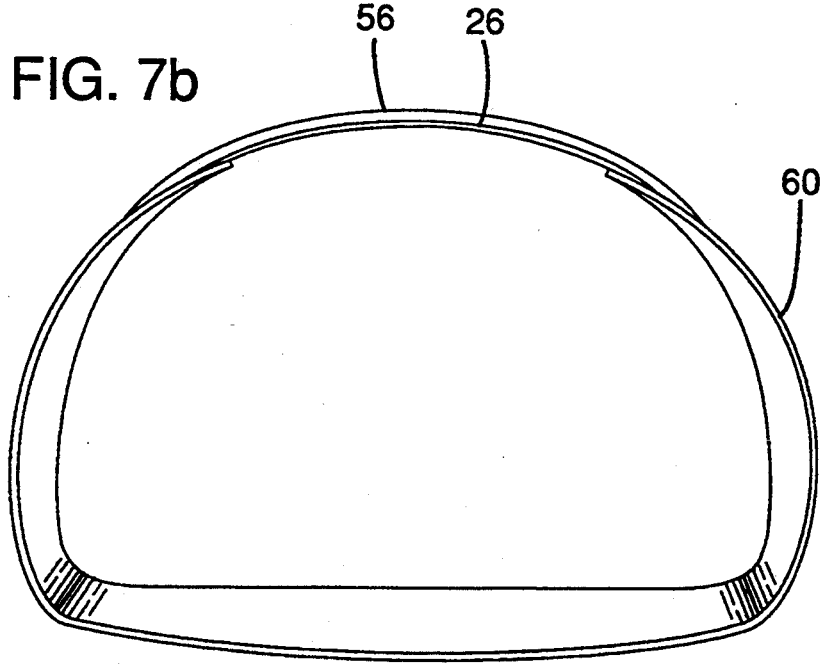

Whereas the tunnel 26 is generally cylindrical in shape, the filled bag spreads and assumes an elliptical shape. FIGS. 5 and 6, which are section views as noted in FIG. 4, illustrate the transformation in the bag shape from cylindrical to elliptical as the bag moves off of and away from the tunnel 26. This transformation, together with the fluent nature of the grain, creates a back flow of the grain that tends to seek and find a path along the outside of and between the tunnel and the bag and then onto the ground. This undesired back flow of the grain is largely eliminated by the provision of a boot or liner 60 that is attached to the tunnel wall and extends rearward into the filled bag. FIGS. 7a and 7b illustrate this liner 60. The liner is a heavy pliable material such as rubber that conforms to transformation of the bag configuration from cylindrical shape to elliptical shape. The liner seals against the bag and inhibits grain from finding a path between the bag and tunnel exterior. The liner 60 is also seen in phantom form in FIG. 5.

Whereas the above describes an illustrative working embodiment of the invention, a number of variations are possible. A modification that is presently contemplated concerns the under carriage, specifically the supporting wheel sets indicated in the figures as wheels 34 and 36.

It is frequently desirable to provide a machine such as the grain bagger with self-propulsion. As contemplated, the wheels 36 are provided without the brakes 38 and function as idler wheels. The front wheels 34 are the equivalent of the front end wheels of a four-wheel drive three-quarter ton pickup which is precisely what has been used to build a prototype of this embodiment. The front end axle arrangement provides both braking ability and steering ability. The front wheel drive is provided with the transmission unit as well as the lock out hubs of the front wheel drive of the pickup. The transmission is hooked up to a hydraulic motor which provides the self-propulsion.

The above-described machines have numerous moving parts requiring motors, hydraulics and the like. These components are considered well known to the art and are, therefore, not detailed herein. It is sufficient to point out that the machine is substantially self-sufficient with all components such as motors 62 and hydraulic fluid storage tanks 64 preferably mounted to the chassis of the machine between the bin and the container.

Figure 8:
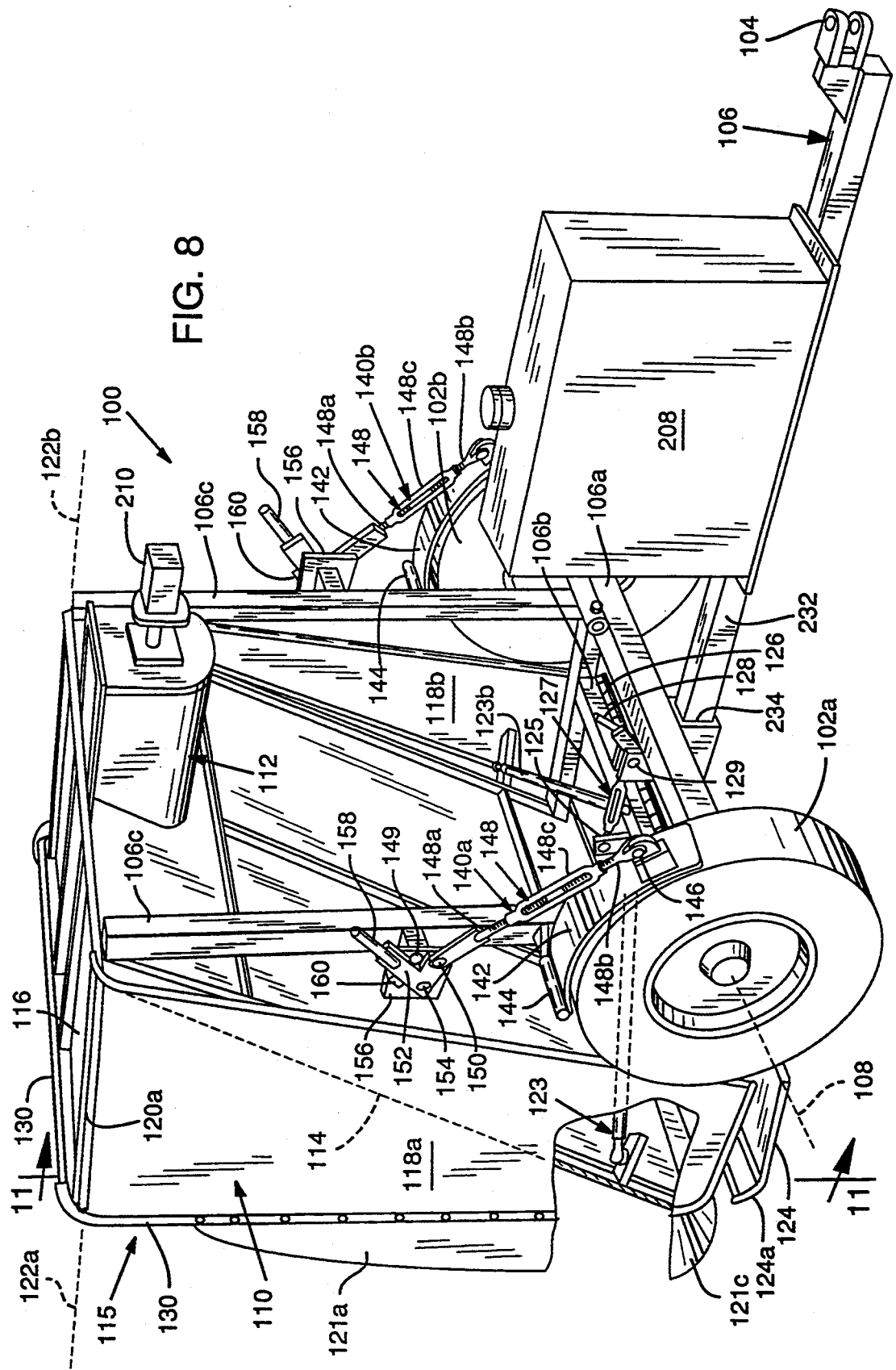
FIG. 8 is a front perspective view partially broken away showing a second grain bagger.
Figure 9:
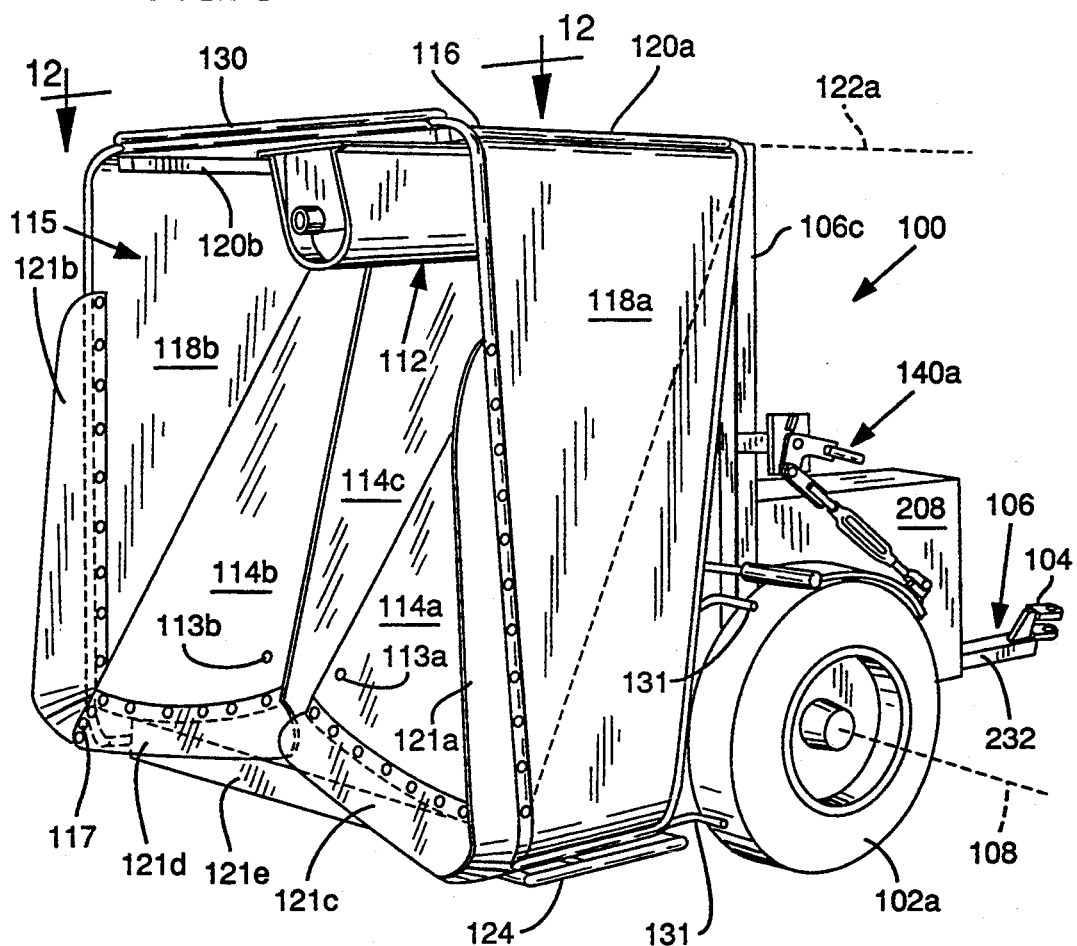
FIG. 9 is a rear perspective view of the grain bagger of FIG 8.

FIG. 8 shows in perspective, partially broken away, a second grain bagger 100 of the present invention finding advantage in reduced cost of manufacture, an ability to accept variation in bag diameter, and an ability to fit well within a conventional overseas cargo box. With such features, grain bagger 100 is well suited for manufacture in one region of the world, and for economical acquisition and use in another distant region of the world. FIG. 9 is a rear perspective view and FIG. 10 a side view of the grain bagger 100.

Figure 10:
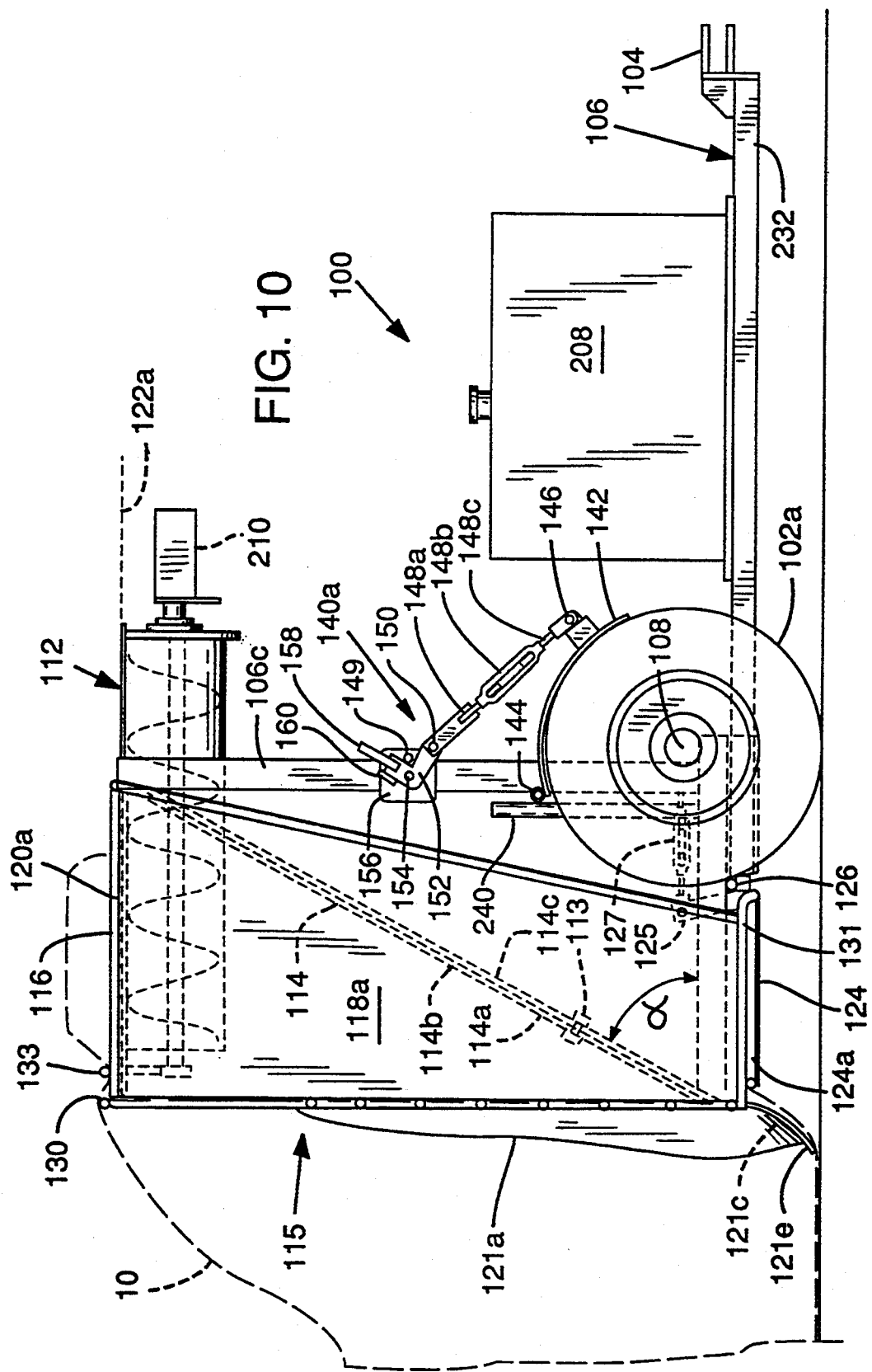
FIG. 10 is a side view broken away of the grain bagger of FIG. 8.

In FIGS. 8–10, grain bagger 100 generally takes the form of a small trailer arrangement having a pair of wheels 102, individually 102a and 102b, sharing a common axis of rotation 108, and a hitch 104 mounted upon a frame 106. The frame 106 as used herein shall refer to the various stationary structural components of the bagger 100. Such components of frame 100 would include a removable tongue 232 slidably receivable within a receiving channel 234 of frame 106, several transverse members 106a and 106b, and a pair of vertical uprights 106c. Grain bagger 100 attaches to a conventional tractor (not shown in FIGS. 8–10) at hitch 104. Frame 106 also carries a cross-sectionally expandable tunnel 110 for receiving a bag 10 (FIG. 10) about its outward facing surfaces and deploying the grain bag 10 rearward as grain flows into tunnel 110 by way of auger 112 and out of tunnel 110 by way of a rear opening 115 into the closed bag 10 as described above.

Tunnel 110 includes an inclined rear facing wall 114 supported by uprights 106c and opposite opening 115. The wall 114 receives incoming grain and which then urges grain bagger 100 forward as the bag fills. Thus, wall 114 closes the forward end of tunnel 110. In its collapsed form, as illustrated in FIGS. 8–10, tunnel 110 takes a generally a rectangular tubular form comprising a top panel 116, carrying at its undersurface the auger 112, and side panels 118, individually 118a and 118b. Side panels 118a and 118b attach to top panel 116 by hinges 120a and 120b, respectively, allowing panels 118a and 118b to pivot outward about respective parallel axes of rotation 122a and 122b and thereby expand the cross-sectional area of tunnel 110. Wall 114 includes moving portions 114a and 114b (FIGS. 9 and 11) each of a generally triangular shape with the outward facing edges fixedly attached, e.g., by welding, to the inner facing surfaces of side panels 118a and 118b, respectively. Wall 114 further includes a stationary portion 114c fixedly attached to frame 106 at an angle α (FIG. 10) relative to a horizontal plane, in the illustrated embodiment of FIG. 8 the angle α is on the order of 67°.

Tunnel 110 includes at the lower periphery of opening 115 boot flaps 121 for better guiding the flow of grain out and away from the tunnel 110 and into the bag 10, i.e., avoid to a back flow of grain under the tunnel 110. The boot flaps 121 correspond to the liner 60 shown for the first described embodiment herein. Side panels 118a and 118b carry boot flaps 121a and 121b, respectively, along each lower rear edge portion. Boot flaps 121c and 121d attach to the lower edge portions of moving portions 114a and 114b, respectively, of wall 114. Boot flap 121e attaches horizontally along the bottom edge of stationary portion 114c of wall 114 and rests below flaps 121c and 121d. Flaps 121a and 121c join by rivets 117 (see also FIG. 11) near the lower rear corner of panel 118a, and flaps 121b and 121d join by rivets 117 at the lower rear corner of panel 118b. Accordingly, as the side panels 118a and 118b pivot, the moving portions 114a and 114b as well as the attached flaps 121a–121d follow. Collectively, boot flaps 121 define the lower edge portions of rear opening 115 and are constructed of heavy pliable rubber material lying within the bag 10 during a grain bagging operation.

Figure 11:
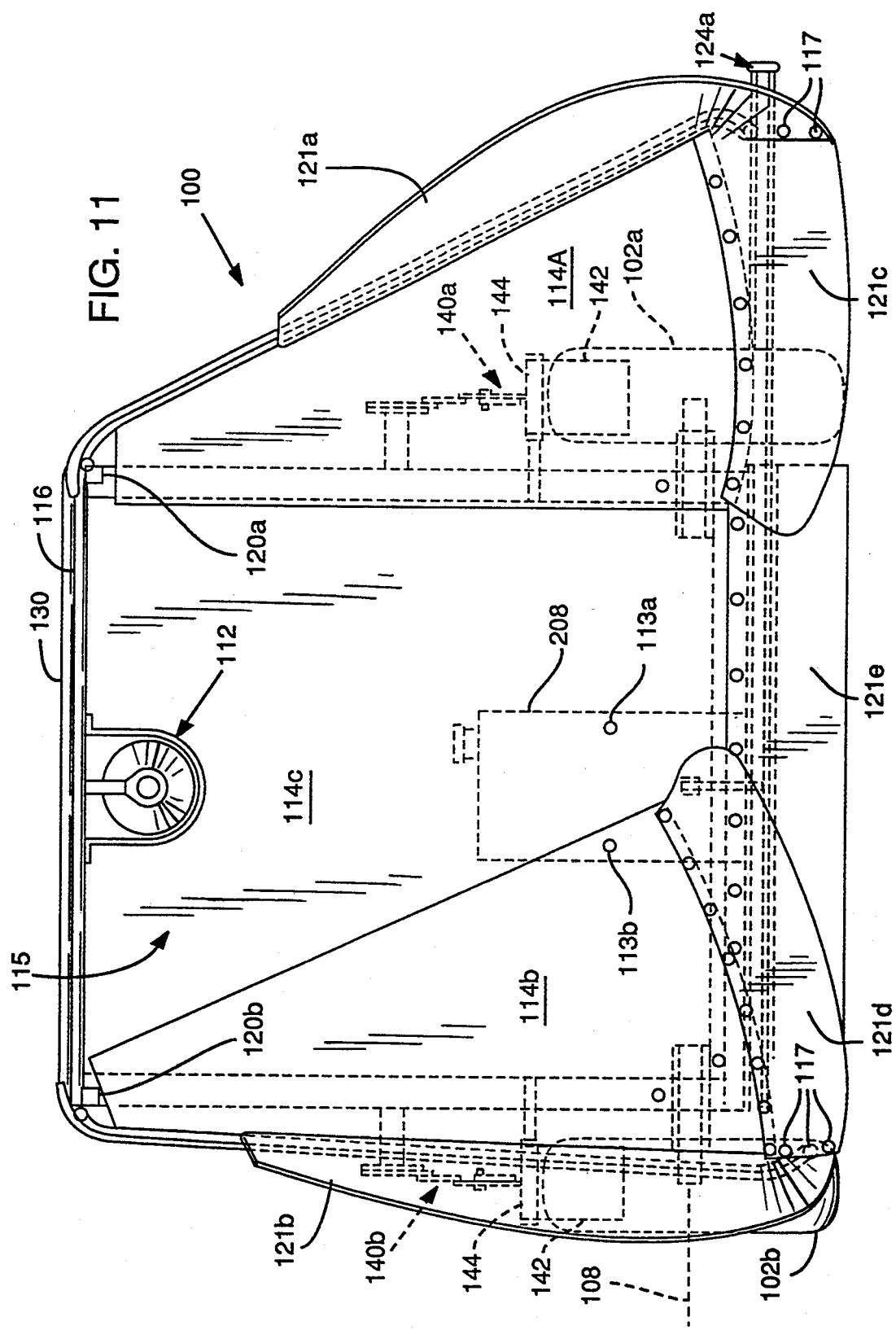
FIG. 11 is a sectional view taken generally along lines 11—11 of FIG. 8 and showing variation in cross-sectional area of the grain bagger for the purpose of accommodating bags of different diameter.
Figure 12:
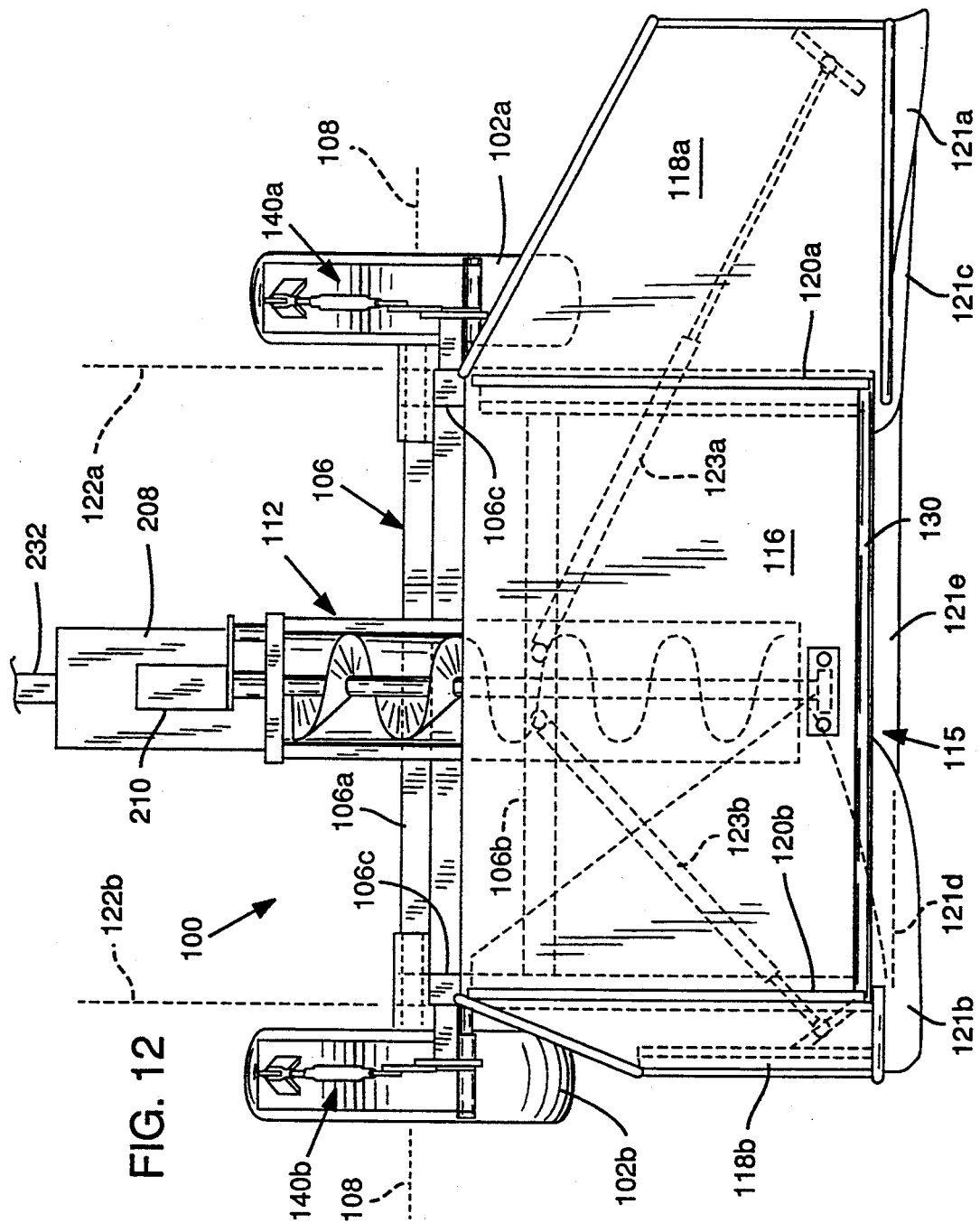
FIG. 12 is a top view taken generally along lines 12—12 of FIG. 9 also showing adjustment in the bin for the purpose of accepting multiple bag diameters.

FIGS. 11 and 12 are sectional end and sectional top views showing pivoting of side panels 118. More particularly, FIGS. 11 and 12 show the side panel 118a in its fully extended or open position and the side panel 118b in its fully closed position. It should be understood that both side panels 118 extend to a full position, as shown by panel 118a, and retract to a closed position, as shown by panel 118b, with intermediate positions available by adjustment in telescopic brace rods 123. In use, it should be further understood, the side panels 118 extend outward symmetrically in carrying and deploying a storage bag 10.

Figure 13:
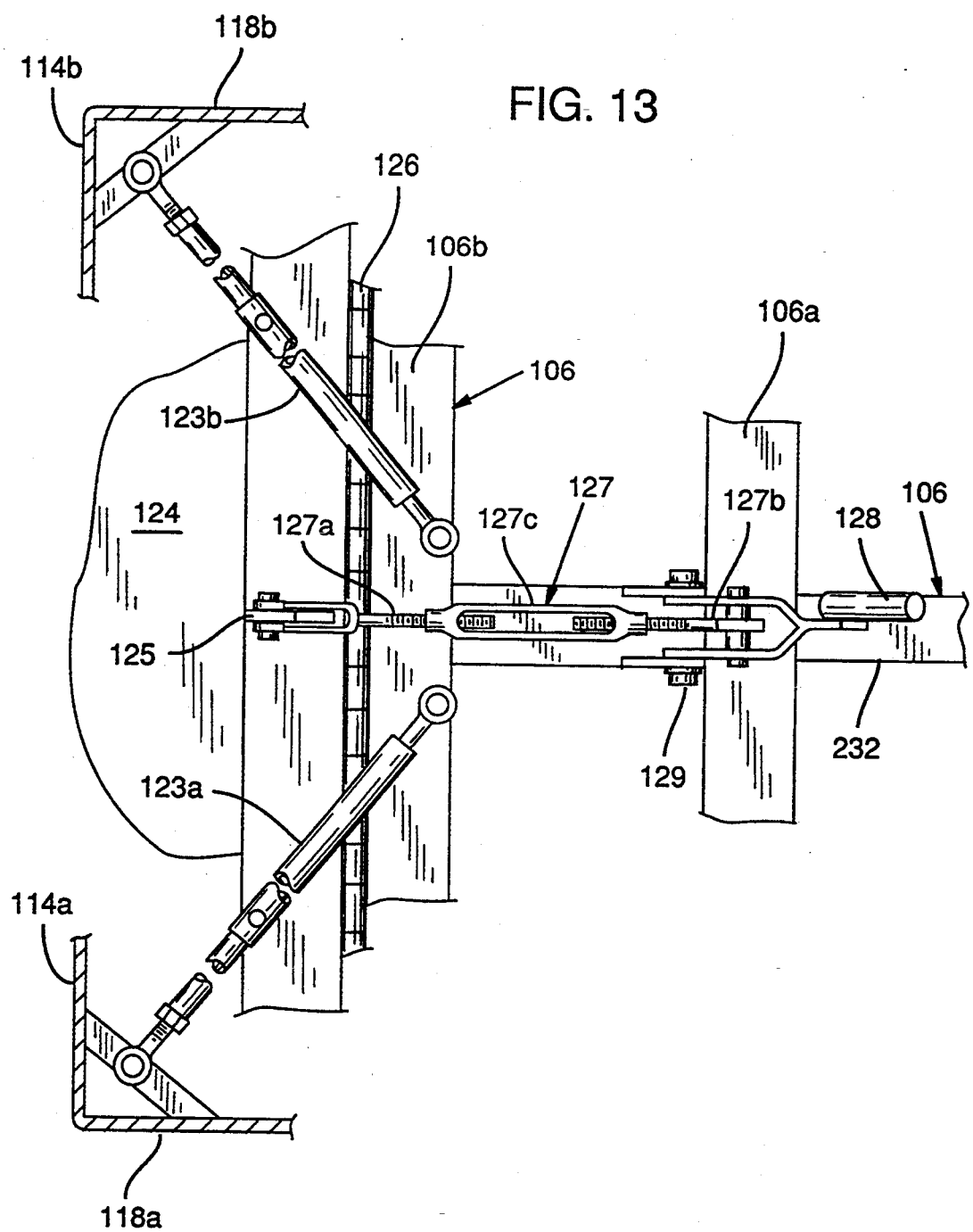
FIG. 13 is a detailed top view showing an overcenter toggle for positioning a bag protecting pan of the grain bagger of FIG. 8 and showing a brace rod for maintaining a given size adjustment of the bin corresponding to a selected grain bag diameter.

As side panels 118 pivot outward, moving portions 114a and 114b follow. Side panels 118 are held in a selected angular position, i.e., corresponding to a selected bag 10 diameter, by corresponding telescopic brace rods 123a and 123b, each pivotally coupled at one end to frame 106 and pivotally coupled at the other end to the corresponding side panel 118 near the bottom rear edge of the panel 118 and near the moving portion 114 of wall 114 (FIG. 13). Length adjustment in rods 123 is by provided by pinning the inner rod and outer sleeve of the telescopic rods 123 at selected apertures. In the collapsed condition of tunnel 110, the moving portions 114a and 114b of wall 114 rest in substantially face-to-face relation, i.e., in parallel contacting relation, but as side panels 118 pivot outward the moving portions 114a and 114b come away from, i.e., move out of parallel relation relative to, the stationary portion 114c. Generally, however, the inner edges of moving portions 114a and 114b remain in contact with the stationary portion 114c. Furthermore, each moving portion 114a and 114b is pinned during operation to the stationary portion 114c by corresponding bolts 113a and 113b (FIGS. 9 and 10) and a series of apertures in stationary portion 114c corresponding to selection positions for side panels 118. The bolts 113 maintain the inner edges of each moving portion 114a and 114b against the surface of stationary portion 114c during a bagging operation. The bolts 113 in combination with the brace rods 123 thereby secure the tunnel 110 in a selected configuration, i.e., a selected cross-sectional area, for receiving a flow of grain from auger 112.

In this manner tunnel 110 maintains the inclined rear facing wall 114 to facilitate grain loading, but also expands radially, i.e., transverse to the longitudinal axis of the bag 10, to carry a bag 10 of selected diameter. The particular grain bagger 100 shown herein can accept storage bag 10 diameters ranging between 8 and 10 feet, but could be adapted to accept a larger range, e.g., between 8 and 12 feet, should such larger variation in storage bag 10 diameter be desirable.

The outward facing surfaces of tunnel 110 receive a folded bag 10 (FIG. 10) across the top of panel 116, down along the outside of side panels 118, and below tunnel 110 forward of the lower edge of wall 114. A shield pan 124 pivotally attached to frame 106 drops below tunnel 110 opening rearward when mounting a bag 10 and raises to capture the bag 10 from below to keep bag 10 from striking objects or dragging on the ground, but is adjustable against bag 10 for proper deployment of bag 10. With reference to FIGS. 10 and 13, pan 124 carries an arm 125 and pivots at hinge 126 by movement of arm 125. Adjustment rod 127 pivotally couples at its left threaded rod 127a to the distal end of arm 125 and at its right threaded rod 127c to a mid-point of handle 128. The proximal end of handle 128 pivotally attaches to frame 106 at the pin 129 whereby an overcenter function is provided by adjustment in turnbuckle 127c of adjustment rod 127. In one position, as shown in FIG. 10, pan 124 is lowered for mounting of bag 10. In the other position for handle 128 pan 124 raises against the bag 10 enough to support the bag 10, but is adjusted at turnbuckle 127c so that bag 10 deployment is not hampered.

It is suggested that the pan 124 be laterally extendable, as indicated at reference numeral 124a in FIG. 11, in order to position the outer side edges of pan 124 substantially at the same laterally extended position as that of the lower edges of side panels 118 in order to fully protect the downward facing portion of bag 10 as mounted upon the tunnel 110. Such lateral adjustment of pan 124 may be accomplished by a center panel and top laterally movable side panels which slide upon the center panel and depend from telescopic support rods allowing lateral extension of panel 124.

Guards 131 protrude from side panels 118, just forward of each wheel 102 in the closed position for side panels 118 and along the rear edge of tunnel 110, to maintain the bag 10 upon the tunnel 110 and prevent rubbing of a mounted bag 10 against wheels 102. A bead 130 follows the rear most edge of top panel 116 and rearmost edges of side panels 118 whereby, in cooperation with an elastic cord 133 (FIG. 10) surrounding the bag 10 just forward of bead 130, the bag 10 is suitably deployed rearward as grain enters tunnel 110, piles against wall 114, and flows into bag 10.

The forward directed force resulting from bag deployment must be controllably resisted for proper bag usage. With reference to FIGS. 8 and 10, hand brakes 140a and 140b apply braking force against respective wheels 102a and 102b in controllable fashion to selectively brake against the forward force of grain loading. Each brake 140 includes a shoe 142 pivotally attaching to frame 106 at post 144 near the top of the corresponding wheel 102 and extending circumferentially and forwardly along the corresponding wheel 102 tread surface. The forward end of shoe 142 pivotally attaches at pin 146 to adjustment rod 148 which in turn pivotally attaches at pin 150 to the downward and forward facing leg of L bracket 152. Adjustment rod includes right and left threaded rods 148a and 148b coupling to pins 146 and 150, respectively, and interconnected by turnbuckle 148c for length adjustment by turning turnbuckle 148c. The corner of L bracket 152 pivots at pin 154 of bracket 156 fixedly attached to frame 106. The upward and forward facing leg of L bracket 152 extends, as by handle 158, for manual pivoting of L bracket 152 about pin 154.

Turnbuckle 148 is adjusted to provide an overcenter function where in one position of handle 158, up in the view of FIG. 10, L bracket 152 bears against stop 160 of bracket 156 and shoe 142 maintains a given pressure against wheels 102, i.e., a braking force corresponding in magnitude to the selected length of rod 148. In the other position for handle 158, down in the view of FIG. 10, L bracket 152 pulls rod 148 and draws shoe 142 away from wheel 102 for a free-wheeling mode. A lock pin 149 for each of brakes 140 inserts within an aperture of bracket 156. More particularly, with the handle 158 in its raised position and the L bracket 152 bearing against the stop 160, the lock pin 149 inserts on the opposite side of the L bracket 152 whereby the L bracket 152 is captured between stop 160 and lock pin 149. In the lowered position for handle 158, the lock pin may again be inserted into the same aperture of bracket 156 to maintain the handle 158 in its lowered position and thereby maintain the shoe 142 away from the wheel 102.

Thus, each hand brake 140 applies by operation of corresponding handles 158 a selected magnitude braking force, or no braking force. A suitable braking force, i.e., as adjusted for a given bagging operation to fill the bag 10 in satisfactory manner, is achieved by adjustment in turnbuckles 148. Further adjustment in turnbuckles 148 can be employed during operation if necessary to maintain a desired grain loading effect. It is contemplated, however, that once a bagging operation begins and the hand brakes 140 are adjusted for current conditions, that no significant further adjustment in the hand brakes 148 would be required.

Figure 14:
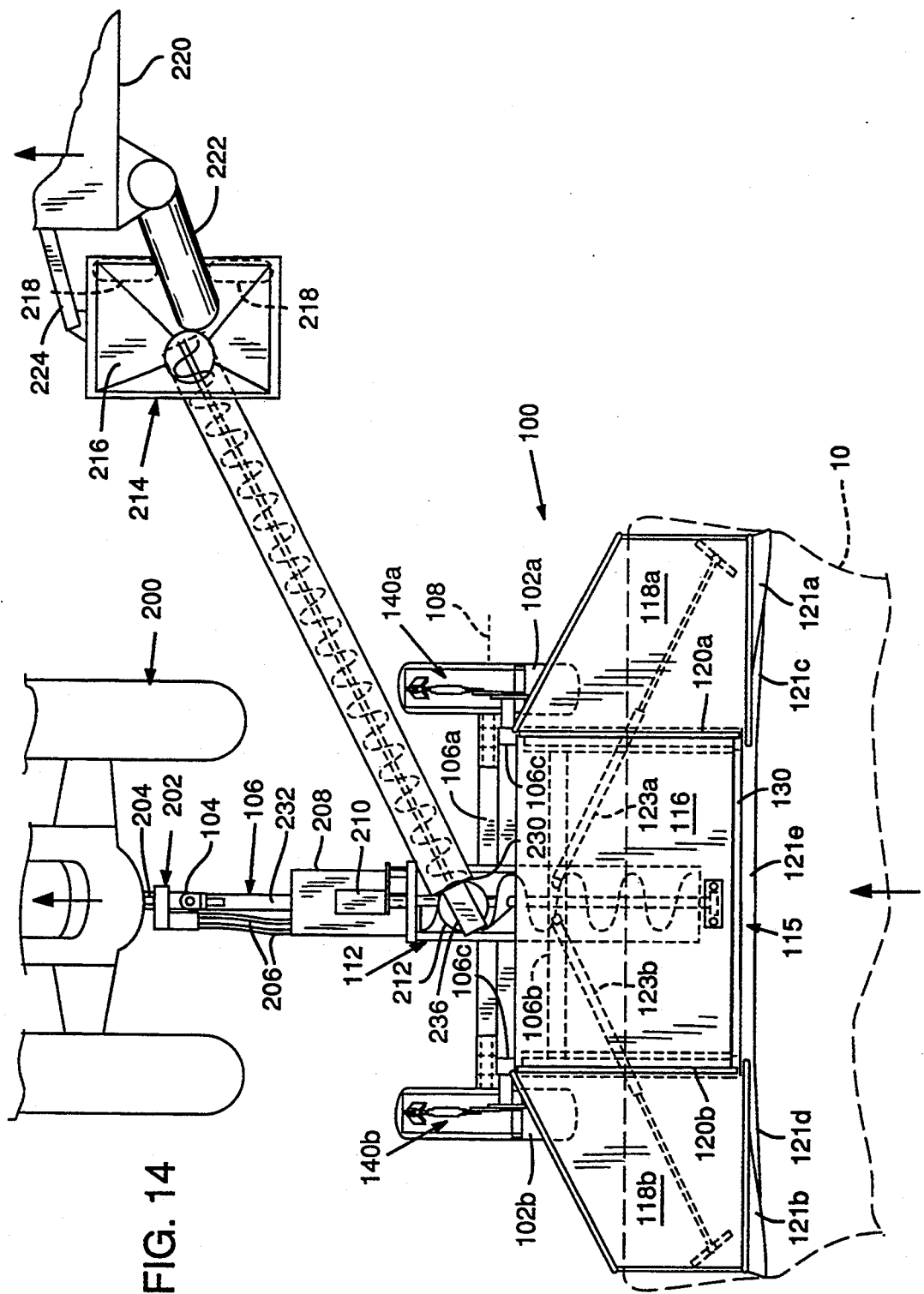
FIG. 14 is a operational plan view showing use of the grain bagger of FIG. 8 as coupled to a tractor and receiving a flow of grain from a side auger which in-turn receives grain from a grain truck.

Referring now to the operational plan view of FIG. 14, grain bagger 100 is coupled to a small conventional farming tractor 200 at the hitch 104. A hydraulic pump 202 attaches to tractor 200 at the spline gear 204 of the tractor 200 power take-off (PTO) for delivering power by way of hydraulic lines 206 to bagger 100. The bagger 100 includes a hydraulic reservoir 208 mounted upon frame 106 of grain bagger 100. Auger 112 then utilizes the power supplied by pump 202 to operate its hydraulic motor 210 to move grain from an input port 212 of auger 112 and into the tunnel 110.

A ground traveling side auger 214 delivers grain from its input bin 216 to the input port 212 of auger 112. Side auger 214 includes a hydraulic motor 236 near its output port 230, the motor 236 being driven by the power supplied to bagger 100 by way of hydraulic lines 206. Bin 216 rests upon the ground and is supported by a pair of ground contacting wheels 218. A grain truck 220 has an output chute 222 for dumping grain into the bin 216. Auger 214 attaches to truck 220 at the coupling 224. In the alternative, auger 214 can be towed by tractor 200.

Thus, the truck 220 moves along with the tractor 200 in a forward direction while dumping grain into the bin 216. Concurrently, the augers 214 and 112 move grain from the bin 216 to the tunnel 110. The grain then begins to pile within the tunnel 110 and flows into the bag 10 and, in accordance with the resistive force provided by brakes 140, bag 10 suitably fills with grain as the entire assembly moves forward in deployment of bag 10. The tractor 200 need not apply any braking force to the assembly, and need only provide a steering function as the assembly moves along in a forward direction. It is suggested that the interconnection between the input portion 212 of auger 112 and the output port 230 of auger 214 be sealed, but allow relative movement between the auger 214 and auger 112.

For more convenient operation of the handles 158 of brakes 140 and 128 of the pan positioning assembly, a pipe 240 (FIG. 10) may be stored on the frame 106. Thus, each of handles 158 and 128 may comprise a short stud which receives the pipe 240 and allows an operator to more easily operate the brakes 140 and pan adjustment mechanism. The pipe 240, therefore, may be stored on a similar stub (not shown) mounted to the frame 106.

The simplified design of the grain bagger 100 presents a relatively small dimensional envelope as compared to prior grain bagging machines. In particular, the frame 106 may be disassembled by removal of the tongue 232 of frame 106 from the receiving channel 234 of frame 106. The reservoir 208 remains attached to the tongue 232 during shipment. The package as so disassembled is approximately 7 feet wide, 6½ feet tall, and 6 feet long. Several such machines 100 may be then placed in one overseas cargo box. For example, in a conventional 40 foot long, 7 foot 8 inch wide, 7 foot 9 inch tall overseas cargo box with a 7½ foot door, five such grain bagging machine 100 may be loaded end-to-end and occupy only 30 feet of the length of the cargo box. This leaves 10 feet of cargo box length for packing a collection of storage bags 10. Additional space is left along the side walls of the cargo box for placing the tongues 232 and along the top for placing the side augers 214. Thus, a collection of such grain bagging machines can be efficiently packed into the cargo box and, therefore, efficiently shipped to distant regions of the world. As may be appreciated, the ability to use an overseas cargo box significantly reduces shipping costs and therefore significantly reduces the acquisition cost for the remote end user.

Thus, an improved grain bagging machine has been shown and described. The improved grain bagging machine is downsized in terms of cost of manufacture, yet provides the desired capability of storing large quantities of crop in storage bags. The grain bagging machine is adapted for use in connection with commonly available farm equipment such as the small tractor 200, grain truck 220, and auger 214 of FIG. 14. The improved grain bagger further includes the capability of accepting variation in storage bag 10 diameter, and is therefore useable by a variety of farming concerns having different storage bags diameter requirements. The grain bagging machine 100 is therefore more readily usable in communal fashion among a group of small farming concerns which would otherwise not have available such advanced agricultural crop storage machines.

Figure 15:
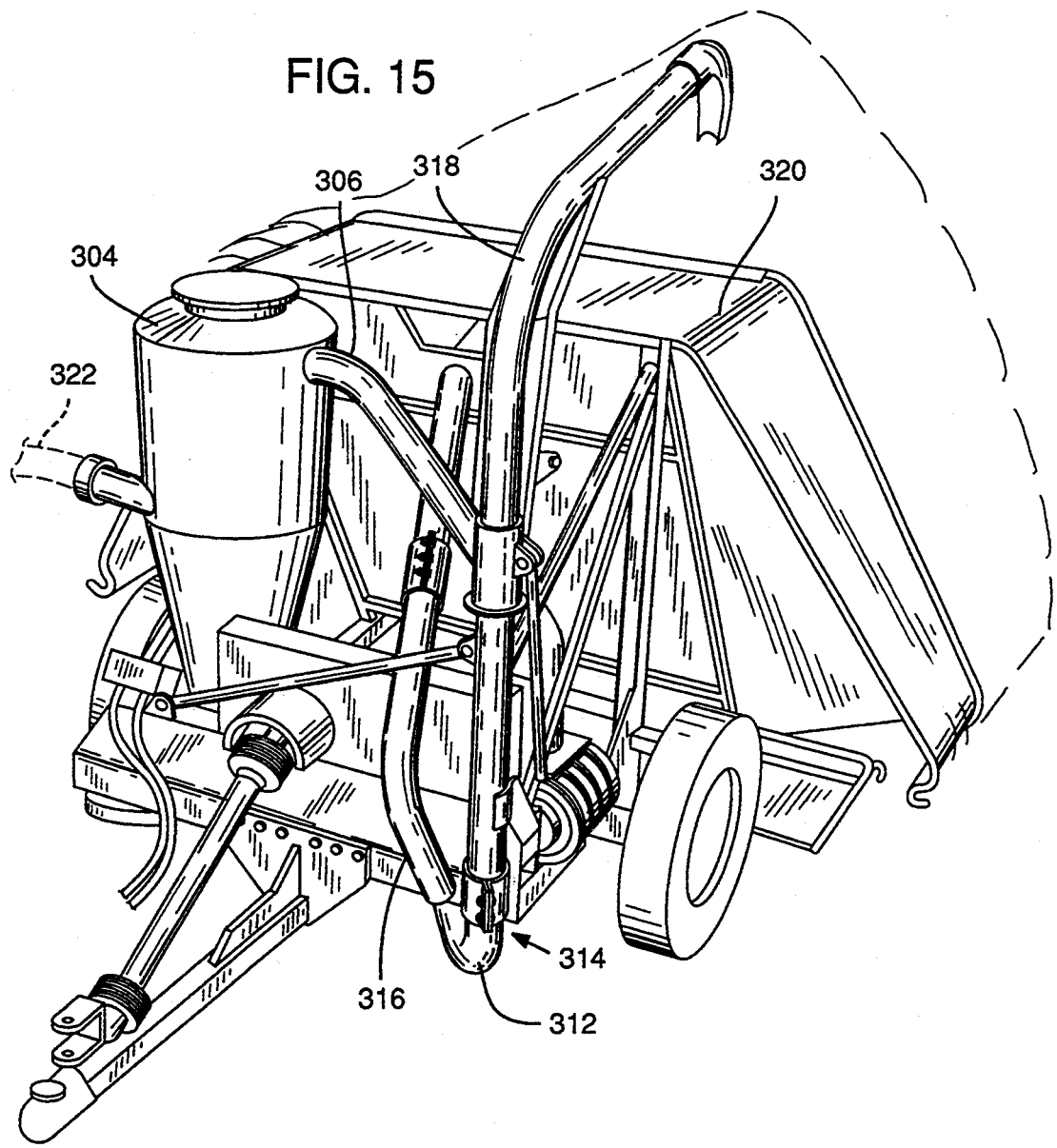
FIG. 15 is a perspective front view of a further embodiment wherein an alternate conveyor system is provided for the machine.
Figure 16:
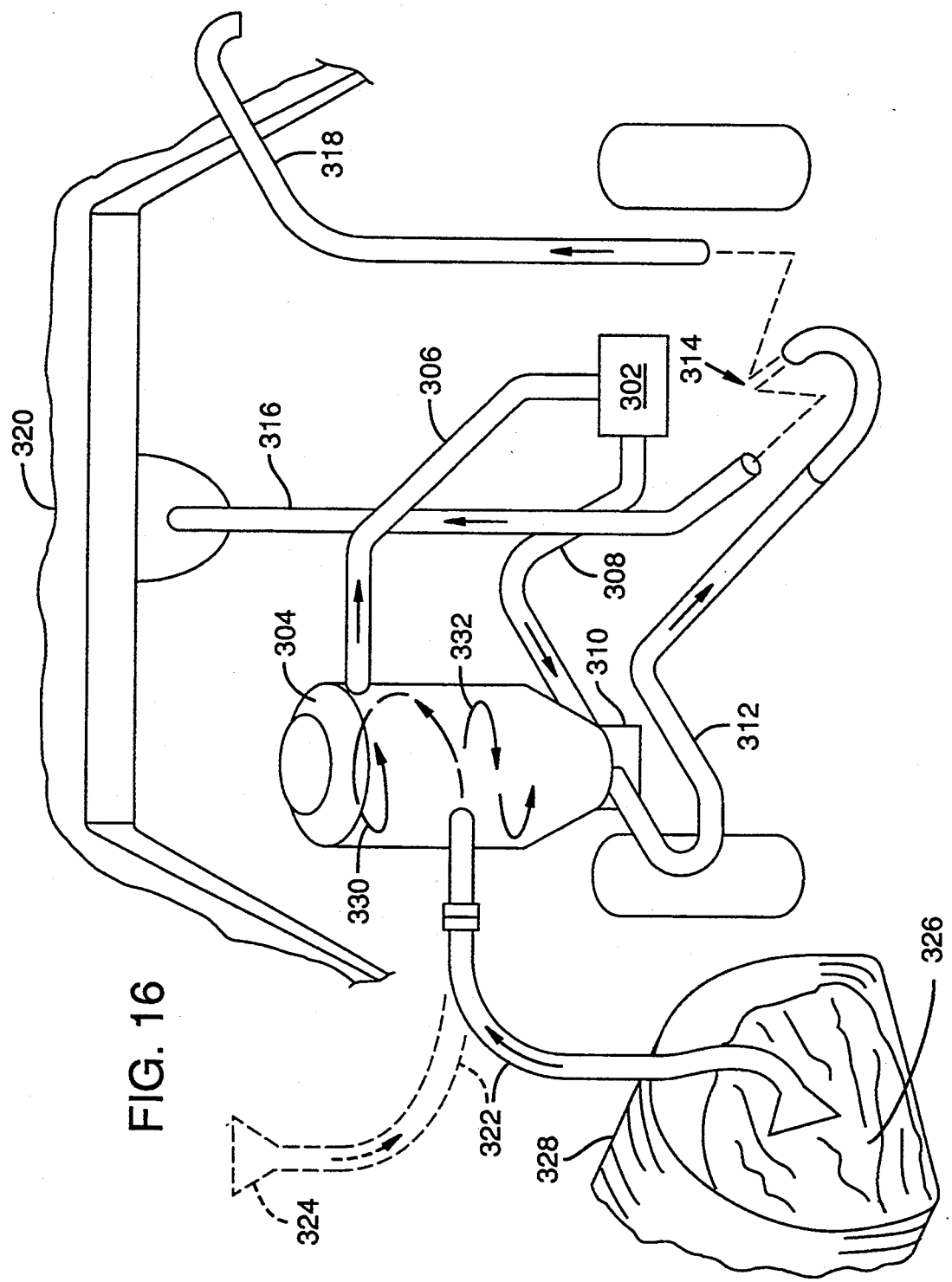
FIG. 16 is a schematic flow diagram illustrating the operation of the conveyor system of FIG. 15.

Reference is now made to FIGS. 15 and 16 which illustrate a different conveyor system as compared to the embodiment shown in FIGS. 1–14. The augers of the embodiments disclosed above are replaced with a vacuum system. An air pump 302 draws air from the top of separation chamber 304 through hose 306 and expels air out through hose 308. Hose 308 is connected to a grain receptacle 310 at the bottom of chamber 304 and hose 312 from receptacle 310 is connected into a juncture 314. Transfer line 316 and line 318 are connected into the juncture 314 for transfer of grain from hose 312 to either the container 320 of the bagging machine or into another container as may be desired by the operator. For example, the grain may be directed into a truck bin. A switch mechanism at junction 3 13 (not shown) enables the operator to selectively connect hose 312 to either of the lines 316 or 318.

A suction hose or line 322 is connected to the chamber 304 as shown and suction hose 322 is flexible and adapted for fitting various nozzles 324 as may be desired for the various applications of the system. As illustrated in solid lines in FIG. 16, the hose 322 may be used to draw grain 326 out of a grain bag 328, or as shown in dash lines, it may be used to draw grain out of a truck bin (not shown).

The operation of the vacuum system as illustrated in FIG. 16 is as follows: The pump 302 draws air through the top of the chamber 304 which draws air from the suction line 322. Assuming first that the operator is filling a storage bag with grain brought to the machines, e.g., in a truck, the suction line 322 is maneuvered to expose the nozzle 324 to the fluent grain of the truck bin (as illustrated in dash lines) and the grain is drawn into the line 322 and directed into chamber 304. Once inside the chamber, the grain settles to the bottom of the chamber and into receptacle 310 as illustrated by arrows 332. However, the air is pulled to the top of the chamber and out hose 306 as indicated by arrow 330. Air is forced as a positive air flow by the pump 302 through hose 308 and through receptacle 310 which then entrains the grain and forces the grain into hose 312. The switch at juncture 314 is of course switched to direct the entrainment of grain through pipe 316 and into the container 320.

Alternatively, by simply switching the switch mechanism at juncture 314 to send grain through pipe 318, and inserting nozzle 324 into the grain contained in a storage bag, the conveyor system can be used to remove the grain from storage and direct it into the bin of a transport truck.

It will be appreciated that the present invention is not restricted to the particular embodiments that have been described and illustrated, and that variations may be made therein without departing from the scope of the invention as found in the appended claims and equivalence thereof. For example, while a window 42 is shown in the wall 40 of the first embodiment, it should be understood that a similar window may be included in the wall 114 of the second illustrated embodiment. Also, while the variation in cross-sectional area of the tunnel 110 is provided by laterally outward extending side panels 118, it may be appreciated that other overlapping panel arrangements may be used with radially outward or inward directed movement to increase or decrease the cross-sectional area of the tunnel 110 in order to accommodate variation in bag 10 diameters. Also, while the illustrated embodiment of the present invention has been shown with reference to variation in grain bag diameter, it may be appreciated how this aspect of the present invention may be applied to silage bag storage by modification of silage compacting machines to accommodate variation in silage bag diameters.

What is claimed is:

1. An agricultural crop storage machine delivering crop into a storage bag while deploying the bag along rearward of the machine onto the ground comprising:

a pair of spaced apart wheels defining an outer width, a frame mounted on the wheels and a tunnel defining a front end and rear end mounted on the frame, said tunnel having opposed sides which cooperatively define inside and outside dimensions of the tunnel and a front wall dimensioned to span between the sides of the tunnel for closing the front of the tunnel, said sides and front wall thereby defining an enclosure having a rear opening through which crop material may be dispensed, a bag surrounding said tunnel at said rear opening, and a crop delivery conveyor projected into the tunnel for delivering crop to the tunnel for transfer into the bag through said rear opening, said sides structured tube laterally movable relative to each other whereby said inside and outside dimensions of the tunnel can be expanded and contracted, said front wall comprised of overlapping panels slidable relative to each other to adjust the dimension of the front wall as the tunnel is expanded and contracted, at least one panel of said overlapping panels connected to one side of the tunnel and a second panel of said overlapping panels connected to the other side of the tunnel whereby lateral movement of the tunnel sides forces sliding movement of the panels to adjust the front wall dimension to the inside dimension of the tunnel, and said rear opening of the tunnel being mated to a designated bag size and said expansion and contraction of the tunnel conforming the rear tunnel opening to different designated bag sizes.

2. An agricultural crop storage machine according to claim 1 wherein said tunnel's outer dimensions are expandable to a width greater than the defined width of the wheels, and is contractible to a width less than the defined width of the wheels, said defined width of the wheels with the tunnel opening fully contracted defining an overall road width and storage width for the machine.

3. An agricultural crop storage machine according to claim 1 wherein releasable fasteners releasably affix the panels of the front wall together at a designated rear opening size.

4. An agricultural crop storage machine according to claim 1 wherein said tunnel includes a top and said sides are hingedly attached to the top for pivoting said sides laterally outward to accomplish said expansion and contraction of said tunnel.

5. An agricultural crop storage machine according to claim 1 wherein said crop storage machine is a granular materials storage machine and said tunnel comprises:

said sides structured to be being each hingedly attached to a top for pivoting laterally outward; and said wall dimensioned to span between said opposed sides, said front wall is an inclined rearward facing wall receiving a flow of granular materials entering said tunnel and including a stationary center portion intermediate said movable sides whereby each of said overlapping panels follow the lateral movement of the corresponding side and said expansion and contraction of said tunnel is accomplished by said pivoting of said sides.

6. A crop bagging machine comprising:

a tunnel for mounting of storage bags thereabout of selected dimension diameter corresponding to a given tunnel cross-sectional area, the tunnel having opposed sides movable relative to each other for expanding and contracting the outside dimension of the tunnel, and a front wall having overlapping portions attached to said opposed sides and movable therewith, said tunnel when collapsed having a given minimal exterior dimensional envelope established with reference to a conventional shipping container;

a first frame portion carrying said tunnel and supported by a pair of spaced apart wheels, said wheels and said frame having an exterior dimension within the dimensional envelope of said tunnel; and a second frame portion attachable to said first frame portion and including a hitch adapted for coupling to a tractor whereby said first and second frame portions may be detached and as detached enable said machine to fit within a conventional shipping container.

7. A crop bagging machine according to claim 6 wherein said tunnel includes a top and said sides each hingedly attached to the top for pivoting laterally outward to accomplish said expanding and contracting of said tunnel.

8. A crop bagging machine according to claim 6 wherein said crop bagging machine is a grain storage machine and said tunnel comprises:

a top;

a pair of sides each hingedly attached to said top for pivoting laterally outward; and said wall is an inclined rearward facing front wall receiving a flow of grain entering said tunnel and including a stationary center portion and movable side portions, each side portion being attached to a corresponding one of said sides whereby each of said moving side portions follow the lateral movement of the corresponding one of said sides and said expanding and contracting of said tunnel is accomplished by said pivoting of said sides.

9. A crop bagging machine according to claim 6 wherein said machine further includes yieldably resistant brakes for each of said wheels, each brake applying a selected magnitude braking force or no braking force.

10. A grain bagging machine for filling flexible storage bags comprising;

a chassis, a container mounted on the chassis and having a rear opening through which grain is delivered into a deployable storage bag, and propulsion means for moving the machine forward as the bag is being filled and deployed from the rear of the machine, and a delivery system for delivering grain into the container which comprises;

an air pump, a separation chamber, and a plurality of delivery hoses, said separation chamber having an outlet and an inlet, a first hose having a first end connected to the inlet of the chamber and a second end adapted to receive grain for transfer to the chamber, a second hose having a first end connected to the outlet of the chamber and a second end connected to the air pump whereby air is drawn from the chamber to create suction in the first hose for drawing grain through the first hose into the chamber, said chamber having a grain receptacle for receiving grain drawn into the chamber and a third hose from the pump to the receptacle and a fourth hose from the receptacle to the container whereby air is forced through the third hose to force grain from the receptacle into and through the fourth hose to be deposited in the container.

11. A grain bagging machine as defined in claim 10 wherein a juncture is provided in the fourth hose, a fifth hose connected at said juncture, and a switch mechanism for selectively directing grain at said juncture through said fifth hose to a transport truck as may be desired and said second hose having its second end maneuverable as between a grain truck to be unloaded and a storage container whereby the delivery system can alternatively deliver grain for storage into a storage bag or withdraw grain from the storage bag and delivered to a transport truck.

12. A crop bagging machine comprising:
  a chassis mounted on wheels and movable along the ground in a forward direction;
  a tunnel mounted on the chassis, said tunnel having opposed sides defining therebetween inside and outside dimensions of the tunnel, a front wall dimensioned to span the inside dimensions of the tunnel and an open rear end;
  a bag surrounding said tunnel and gathered onto said tunnel and closing said rear end of the tunnel, and delivery means for delivering a crop material into the tunnel and through the open rear end into the bag and thereby deploying the gathered bag off the tunnel and onto the ground;
  said delivery means and tunnel cooperatively arranged to urge forward movement of the chassis as crop material is delivered into the bag and the bag is deployed off the tunnel, and the improvement which comprises;
  said sides each having a panel portion defining a part of the front wall in the plane of the wall, said panels having an overlapping relationship in the front wall providing for lateral extension thereof; and
  said sides including said panel portions being laterally movable relative to each other, and means to laterally move said sides and panel portions thereby changing the inside and outside dimensions of the tunnel and maintaining a front wall dimension that spans the inside dimension of the tunnel.

13. A crop bagging machine as defined in claim 12 wherein said tunnel includes a top and each of said sides are pivotally attached to said top, said means to provide lateral movement of the sides providing pivotal lateral movement thereof.

* * * * *

UNITED STATES PATENT AND TRADEMARK OFFICE
CERTIFICATE OF CORRECTION

PATENT NO. : 5,419,102
DATED : May 30, 1995
INVENTOR(S) : Inman et al

It is certified that error appears in the above-indentified patent and that said Letters Patent is hereby corrected as shown below:

Claim 1: Col. 13, line 15, change "tube" to --to be--.

Claim 5: Col. 13, line 53, after "sides" delete [structured to be]; Col. 13, line 55, after "wall" delete [dimensioned to span between said opposed sides, said front wall].

Claim 6: Col. 13, line 68, after "sides" insert --structured to be--; Col. 14, line 2, after "wall" insert --dimensioned to span between said opposed sides, said front wall--.

Signed and Sealed this

Fifteenth Day of August, 1995

Attest:

BRUCE LEHMAN

Attesting Officer     Commissioner of Patents and Trademarks